(No Model.) 2 Sheets—Sheet 2.
E. E. WOLF.
VARIABLE SPEED GEAR.
No. 525,479. Patented Sept. 4, 1894.
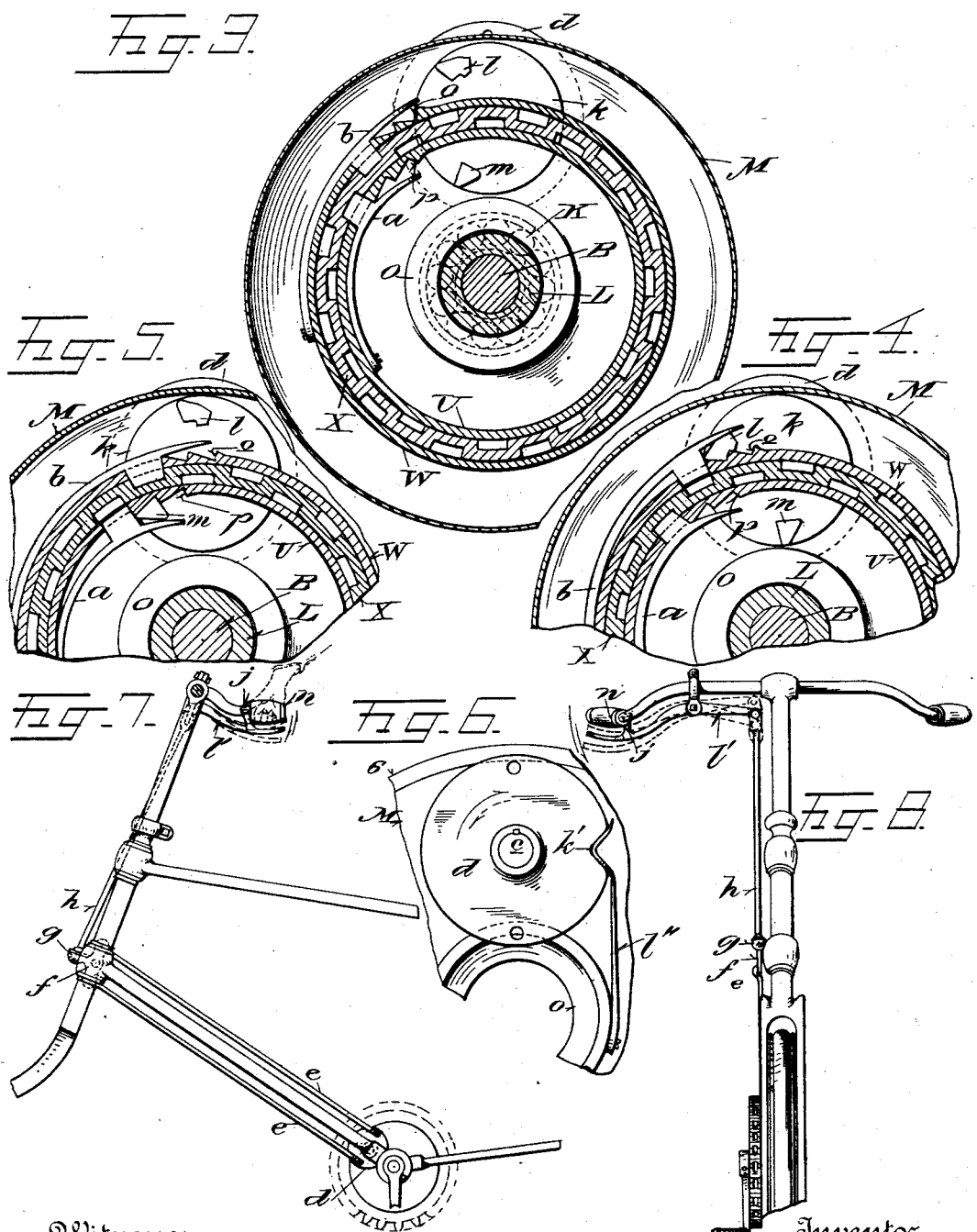

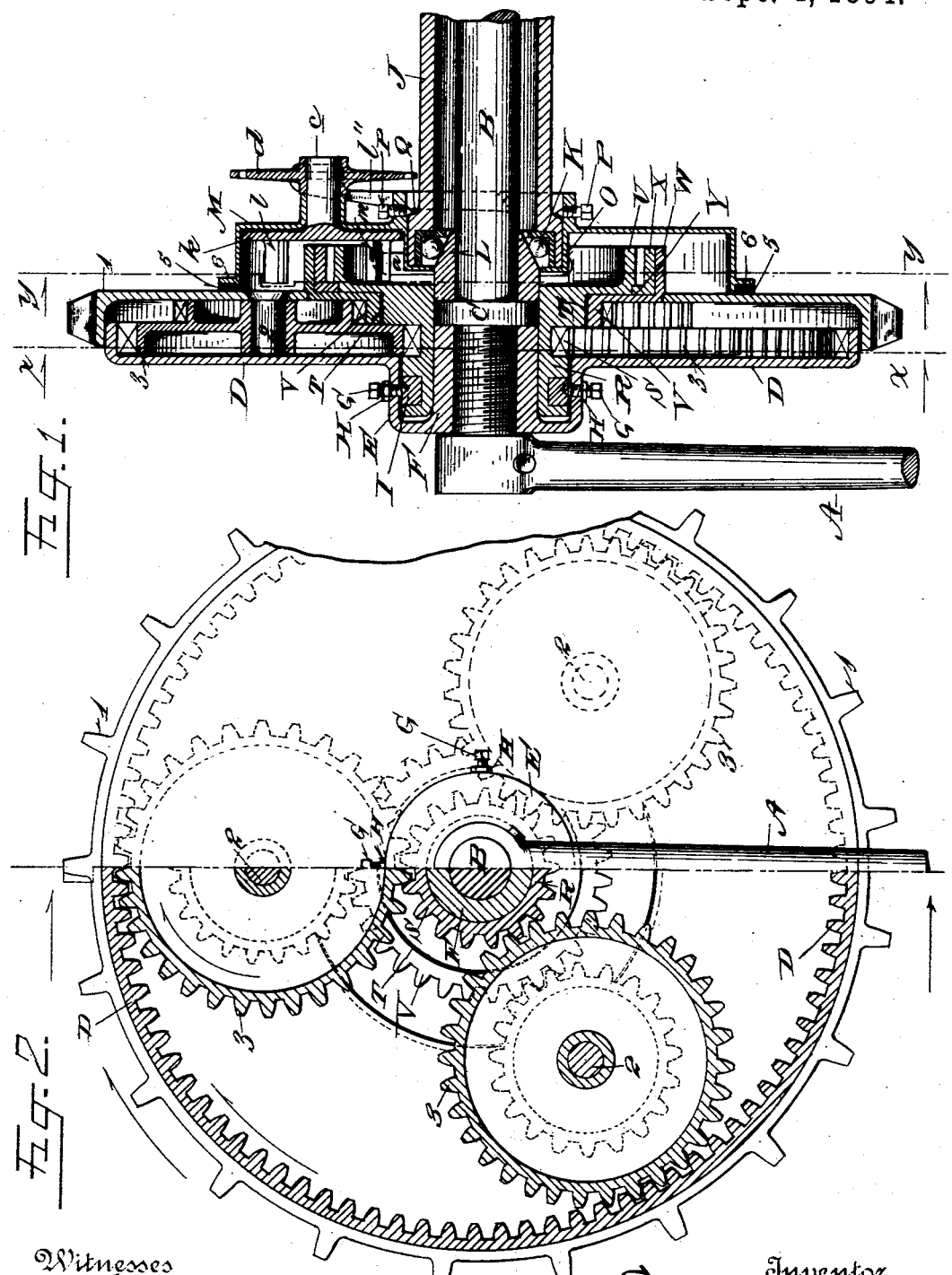

UNITED STATES PATENT OFFICE.

ELMER E. WOLF, OF SPRINGFIELD, OHIO, ASSIGNOR OF ONE-HALF TO JOHN M. GOOD, OF SAME PLACE.

VARIABLE-SPEED GEAR.

SPECIFICATION forming part of Letters Patent No. 525,479, dated September 4, 1894.

Application filed October 30, 1893. Serial No. 489,460. (No model.)

*To all whom it may concern:*

Be it known that I, ELMER E. WOLF, a citizen of the United States, residing at Springfield, in the county of Clark and State of Ohio, have invented certain new and useful Improvements in Variable-Speed Gears, of which the following is a specification, reference being had therein to the accompanying drawings.

This invention relates to certain new and useful improvements in gearing for transmitting a number of different speeds and is designed with special reference to use in connection with tricycles and bicycles.

I carry my invention into practice by a new and improved organization of gear wheels and pinions, with the necessary adjunctive devices to enable the rider to change from maximum to minimum or to an intermediate speed, without stopping his machine. In case the invention is used on other than manual propelled machines these adjunctive devices will either be omitted altogether or will be modified to suit the particular occasion or use.

In the accompanying drawings on which like reference letters and figures indicate corresponding parts: Figure 1, represents a diametrical sectional view of my improvements as applied to a bicycle; Fig. 2, a partial side elevation and partial sectional view, the latter being taken on the line $x\,x$ of Fig. 1; Fig. 3, a transverse sectional view on the line $y\,y$ of Fig. 1 in which the parts are in the relation for the high or maximum speed; Fig. 4, a similar view on the same line with the parts in position for the minimum or lowest speed; Fig. 5, also a similar view on the same line with the parts in position for the intermediate speed; Fig. 6, a detail view of a part of the cam device for actuating the locking springs; Fig. 7, a side elevation of a portion of a bicycle frame showing the means of operating the cam devices; and Fig. 8, a front view of a portion of the frame of such machine showing portions of said devices.

I will describe the invention in its relation to a bicycle, but wish it to be understood that in doing this I am merely describing one of its uses or applications.

The letter A designates the crank or treadle; B the driving shaft to which the crank is pinned and C a shoulder on the axle. An internal gear wheel D is secured to the axle, as by being screwed thereon up against this shoulder. The gear is preferably in the form of a disk with a hub E and a sleeve F, the latter being the part screwed to the axle. Set screws G having lock nuts H are carried by the hub and by engagement with an annulus I operate to hold the parts in close contact and against spreading apart laterally.

The letter J designates a fixed bearing extending from the frame of the machine and having a ball bearing-proper shown at K, the axle being carried in a tapering sleeve L which rolls on the balls of the bearing. A stationary shell or casing M fits over the bearing J and has a flange O which comes against the inner end of the bearing. Set-screws P carried by the casing impinge against an inclined shoulder Q of the bearing and serve to firmly lock together the casing and bearing J.

On the sleeve F of the hub E and on the collar C and sleeve L is mounted a pinion R. This pinion has its teeth at S and is shouldered at T and finally terminates in the annular flange U. Then there is another pinion marked V which runs upon the shoulder T of the pinion R and which finally terminates in an annular flange W. Between these pinions is an internally and externally notched ring X, such ring having a flange Y rides on the flange U. This ring is used together with a spring detent $a$ carried by the flange U and a spring detent $b$ carried by the flange W for the purpose of interconnecting or interlocking the pinions R and V; see Fig. 3. When these two pinions are interlocked, as shown in Fig. 3, then the speed is at the normal or high speed and is in unison with the speed of the shaft B as imparted to it by the crank or treadle. There is provided a certain device which performs the functions of a cam to throw these spring detents out of the positions shown in Fig. 3 to the positions shown in Figs. 4 and 5, and the further function of co-operating with these springs respectively, to cause either of them to assist in forming a locked connection of its annular flange U or W, as the case may be, with this device. This device I will term a cam device notwithstanding its function of assisting in forming such locked connection, and such term of cam device will be understood as including one or both of these functions as the situation may require. It consists of a stud or spindle c, mounted in the fixed casing M and carrying on its outer end a disk or yoke piece d, with which are engaged the actuating rods e, shown in Fig. 7, such rods being in turn connected with a cross head f, pivoted at a convenient place on the frame of the machine and having an arm g, which forms a ball-and-socket joint, or other suitable joint, with a pitman h pivoted to a hand lever l' carried by the handle, or some convenient part of the machine, and having a thumb piece j by which it is easily pressed down with the thumb or hand so as to rock the cross-head f and actuate the rods e to turn the disk or yoke d and correspondingly turn the cam disk k on the inner end of the stud c. At suitable places the cam disk carries lugs l and m respectively which occupy such position and are of such shape that l will engage with the spring detent b, and the teeth o of the ring W, and so that m will engage with the spring detent a and the teeth p of the ring U.

If it be desired to disengage the spring detent b from the ring X, as shown in Fig. 3, to the position as shown in Fig. 4, the hand lever l' is lifted at the hand-end, when the lug l will come down into the path of the detent and lift the latter as it rotates up to the lug, the lug at the same time settling down into engagement with one of the teeth o of the flange W. In this position of the parts the pinion V will be locked to the frame of the machine and the speed will be the minimum or lowest, as will presently appear.

To disengage the detent a, from the ring X, the hand lever l' is pressed down upon at the handle n by which the lug m, is brought into the path of said detent, and when the latter rotates up to it it is forced out of engagement with the ring X, the lug m, at the same time, moving into engagement with one of the teeth p of the flange U and thereby locking the pinion R with the frame of the machine and at the same time breaking the connection between the frame and the other pinion V. In this position of the parts the intermediate speed is attained, as will presently appear.

I come now to describe the devices for transmitting motion from the internal gear D, and through the instrumentalities of these pinions R and V respectively to the sprocket wheel of the machine. This sprocket wheel is shown at 1, and carries stud shafts 2 on which are loosely mounted pinions 3, of which there are three, as shown in Fig. 2. These pinions have two faces, one of greater diameter than the other. The teeth of the larger mesh with the pinion R and the teeth of the smaller mesh with the pinion V. Thus the sprocket wheel 1 is supported, and thus motion of two kinds but of three speeds is imparted to it.

I will first describe how the maximum speed is imparted to the sprocket wheel. Rotary motion is given the crank, and through it the shaft B and the internal gear D. This gear wheel meshes, or rather locks, with the pinions 3 in their larger diameter and they in turn engage with the pinions R and V, and these in turn are interconnected by means of the detents a and b and ring X, as seen in Fig. 3, at which time they are both disconnected from the frame and are therefore free to turn about the axis of the shaft B. As the speed of the pinions R and V (their motion being received from the differential motion of the pinions 3) is different, and as they are interlocked, therefore neither of them can turn when they are interlocked. Thus the pinions 3 are also interlocked from turning on their own axes, and hence they and the pinions R and V all become locked against rotation about their respective axes, and therefore act as mere spokes and all rotate with the gear wheel D. As the pinions 3 are carried on studs supported by the sprocket wheel 1, this sprocket wheel must also turn about the axis of the shaft under these conditions. Hence under such conditions the sprocket wheel rotates in unison with the shaft.

I will now describe the operation when the minimum or lowest speed is obtained. The pinion V is locked to the frame by adjusting the parts to the position shown in Fig. 4, in the manner already described. This done, the pinion V cannot rotate at all. Therefore when the internal gear D is rotated it will result in rotating the pinions 3 because they will be engaged by the fixed pinion V, causing them to assume a planetary motion by rotating around the axis of the shaft B and around their individual axes. Thus as they roll around they carry their shafts 2 and these shafts in turn carry the sprocket wheel 1 around with them. As the smaller diameter of the pinions 3 is engaging with the larger of the two pinions R and V the speed thus obtained in the sprocket wheel is minimum.

I will now describe the intermediate speed. Exactly what this will be as compared with the other speed will depend upon the relative diameters of the pinions 3 with the pinion R. The same operation takes place as that last described, but instead of locking the pinion V to the frame, the pinion R for this intermediate motion is locked to the frame by adjusting the parts as shown in Fig. 5.

Referring to Fig. 1 it will be seen that I provide a packing 5 held by a flange 6 on the fixed casing M to prevent dust and mud from getting into the gears.

In Fig. 6 it will be seen that the cam d is notched as shown at k', to receive a yielding detent $l''$ which holds it when in the normal or high speed position, and yet allows it to turn to either of the other positions.

Having thus fully described my invention, what I claim as new, and desire to secure by Letters Patent, is—

1. In variable speed gearing, the combination with the driving shaft, a gear wheel fixed thereto and different sized pinions loosely and independently mounted concentric to said shaft, and locking devices to interlock said pinions for one speed and to interlock either of them with the frame for different speeds, of a sprocket wheel loosely mounted concentric to said shaft, and planetary pinions carried by said sprocket wheel and meshing with said gear wheel and said pinions.

2. In a variable speed gearing, the combination with a driving shaft, a gear wheel fixed thereon, different sized pinions loosely mounted concentric to said shaft, and locking devices proper carried by said pinions, a fixed casing housing the locking devices, cam devices carried by the casing and operating within it in conjunction with the locking devices proper to interlock the two pinions or to lock either of them with the casing, of a sprocket wheel concentric to the shaft, and planetary pinions carried by the sprocket wheel and meshing with the gear wheel and said pinions.

3. In a variable speed gearing, the combination with a driving shaft, a gear wheel carried thereby, different sized pinions loosely mounted concentric to said shaft, a flange on each pinion, a spring detent on each flange, an inner and outer notched ring between the flanges, a fixed casing, cam devices mounted therein with lugs to engage said spring detent and said flanges, of a sprocket wheel concentric to said shaft and planetary pinions carried thereby and meshing with said gear wheel and said other pinions, the detents, rings, and cam device, being adapted to interlock the first named pinions or to lock either of them with the casing.

4. In a variable speed gearing, the combination with a driving shaft, a gear wheel having a hub-sleeve fixed thereon, a pinion loosely mounted on the hub sleeve, a second pinion of different diameter loosely mounted on a part of the first pinion, locking devices to interlock said pinions and to lock either of them with a fixed part, of a sprocket wheel fitting over the gear wheel and said pinions, and planetary pinions carried by the sprocket wheel and meshing with the gear wheel and both of said pinions.

5. In a variable speed gearing, the combination with a driving gear having a hub-sleeve fixed thereon, of a pinion mounted on said hub-sleeve, and a second one mounted on the first one, each pinion having a flange, a detent carried by each flange, a notched ring between the flanges with which one or both of said detents engage, mechanism for operating said detents, a sprocket wheel and its pinions meshing with said first named pinions, for the purpose set forth.

In testimony whereof I affix my signature in presence of two witnesses.

ELMER E. WOLF.

Witnesses:
W. M. McNAIR,
OLIVER H. MILLER.